United States Patent
Wang

(10) Patent No.: US 7,258,451 B2
(45) Date of Patent: Aug. 21, 2007

(54) OPTICAL PROJECTION DEVICE AND ADJUSTING METHOD THEREOF

(75) Inventor: Sze-Ke Wang, Miao-Li County (TW)

(73) Assignee: Coretronic Corporation, Miao-Li County (TW)

( * ) Notice: Subject to any disclaimer, the term of this patent is extended or adjusted under 35 U.S.C. 154(b) by 115 days.

(21) Appl. No.: 11/160,824

(22) Filed: Jul. 12, 2005

(65) Prior Publication Data

US 2006/0092389 A1 May 4, 2006

(30) Foreign Application Priority Data

Oct. 28, 2004 (TW) .............................. 93132695 A

(51) Int. Cl.
- *G03B 21/28* (2006.01)
- *G03B 21/26* (2006.01)
- *G03B 3/00* (2006.01)
- *G03B 21/20* (2006.01)
- *G02F 1/1335* (2006.01)
- *H04N 5/74* (2006.01)
- *G02B 6/32* (2006.01)

(52) U.S. Cl. ............................ 353/99; 353/37; 353/98; 353/101; 353/102; 348/759; 348/771; 359/223; 359/578; 359/584; 349/5; 385/34; 385/133; 362/551

(58) Field of Classification Search .................. 353/99, 353/20, 30, 31, 37, 97, 98, 101, 102, 121, 353/122; 348/739, 744, 759, 771; 359/196, 359/223, 226, 578, 584, 618, 641, 642, 649, 359/813, 872; 349/5, 7–9; 385/34, 133; 362/551, 561

See application file for complete search history.

(56) References Cited

U.S. PATENT DOCUMENTS

| | | | |
|---|---|---|---|
| 7,018,044 B2* | 3/2006 | Chen et al. | 353/31 |
| 7,182,463 B2* | 2/2007 | Conner et al. | 353/31 |
| 2003/0086148 A1* | 5/2003 | Naito | 359/291 |
| 2006/0066819 A1* | 3/2006 | Wang et al. | 353/99 |

FOREIGN PATENT DOCUMENTS

| | | |
|---|---|---|
| JP | 2004085780 | 3/2004 |
| TW | 499563 | 8/2002 |
| TW | 550396 | 9/2003 |
| TW | M246632 | 10/2004 |

* cited by examiner

*Primary Examiner*—W. B. Perkey
*Assistant Examiner*—Rochelle Blackman
(74) *Attorney, Agent, or Firm*—Jianq Chyun IP Office

(57) ABSTRACT

An optical projection device including an illumination system, a reflective light valve and a projection lens is provided. The adjustable reflection sheet is disposed behind the adjustable rod integrator along the light transmission path of the light beam. In addition, the reflective light valve is disposed behind the adjustable reflection sheet along the light transmission path of the light beam. The adjustable rod integrator can shift the light transmission path of the light beam so as to be incident to the reflective light valve. Moreover, the projection lens is disposed behind the reflective light valve along the light transmission path of the light beam. The adjustable reflection sheet can shift the light transmission path of the light beam so as to pass through the stopper of the projection lens.

20 Claims, 9 Drawing Sheets

OPTICAL PROJECTION DEVICE AND ADJUSTING METHOD THEREOF

CROSS-REFERENCE TO RELATED APPLICATION

This application claims the priority benefit of Taiwan application serial no. 93132695, filed on Oct. 28, 2004. All disclosure of the Taiwan application is incorporated herein by reference.

BACKGROUND OF THE INVENTION

1. Field of the Invention

The present invention relates to an optical projection device and the adjusting method thereof. More particularly, the present invention relates to an optical projection device for projecting an image with high brightness and high contrast, and the adjusting method thereof.

2. Description of Related Art

Recently, projectors such as liquid crystal projectors and digital light processing (DLP) projectors are gradually replacing the conventional cathode ray tube (CRT) display, since the conventional CRT display is large and heavy. In contrast, the projector is lighter, thinner and portable, and can be connected to digital products for displaying images. Therefore, manufacturers have developed a variety of inexpensive multi-functional projectors. In addition, the projectors can also be used for presentation at school, company or other public places, even for displaying movies for entertainment at home. Therefore, it is highly desirable to improve the quality of the projectors for improving the display quality of image in order to have a competitiveness edge of the market.

As shown in FIG. 1, the conventional optical projector 100 includes an illumination system 110, a digital micromirror device (DMD) 120 and a projection lens 130. The illumination system 110 includes a light source 112, a rod integrator 114, a lens 116 and a reflection sheet 118. The light source 112 provides a light beam 112a, and the rod integrator 114, the lens 116 and the reflection sheet 118 are disposed along the light transmission path of the light beam 112a. The lens 116 is disposed between the rod integrator 114 and the reflection sheet 118. The DMD 120 is disposed behind the reflection sheet 118 along the light transmission path of the light beam 112a. The projection lens 130 is disposed behind the DMD 120 along the light transmission path of the light beam 112a, wherein the projection lens 130 includes a stopper 132.

In the optical projector 100 described above, the light beam 112a provided by the light source 112 sequentially passes through the rod integrator 114, the lens 116 to reach the reflection sheet 118. The reflection sheet 118 reflects the light beam 112a towards the DMD 120. Thereafter, a plurality of micro mirrors constituting the DMD 120, at "ON" state, reflects the light beam 112a towards the projection lens 130. On the contrary, the micro mirrors constituting the DMD 120, at "OFF" state, diverge the light beam 112a from the projection lens 130. Thereafter, the projection lens 130 projects the light beam 112a on the screen 300 to form an image on the screen 300.

In general, since a variety of errors may occur, for example, due the size of light source 112, rod integrator 114, lens 116, reflection sheet 118 and DMD 120 used, the oblique angle of the micro mirrors of DMD 120, the position of stopper 132 of the projection lens 130, and the relative position between various components of the projector. It should be noted that the cumulative error of various errors described above degrade the quality of the image projected by the projector 100, and thereby indirectly decrease the yield of the optical projector 100. Hereinafter, the influence of the oblique angle of the micro mirrors of the DMD 120 and the position error of the lens 116 will be described as an example.

FIG. 2A and FIG. 2B illustrate the relationship between the oblique angle of micro mirrors of the DMD 120 and the imaging position of the image. Referring to FIG. 2A, the oblique angle θ of the micro mirror 122 of the DMD 120 (as shown in FIG. 1) is 12° under normal condition. When the micro mirror 122 is at "ON" state, the light transmission path of the light beam 112a includes path A and path B. At this moment, the light beam 122a is incident on the stopper 132 of the projection lens 130. On the other hand, when the micro mirror 122 is at "OFF" state, the light transmission path of the light beam 112a includes path A and path D, and the angle between path B and path D is 48°.

Now, referring to FIG. 2B, if the oblique angle θ of the micro mirror 122 of DMD 120 is only 11° and when the micro mirror 122 is at "ON" state, the path B' diverges from the path B, and when the micro mirror 122 is at "OFF" state, the angle between path D' and path B is only 46°. Because the light beam 112a cannot be precisely incident on the stopper 132 of the projection lens 130, the brightness of the image is reduced. In addition, the angle between path D and path B, which is 48° under normal condition, is reduced to 460 (the angle between path D' and path B) when the oblique angle of the micro mirror 122 of the DMD 120 is slightly deflected from 12° to 11°. Therefore, when the micro mirror 122 is at "OFF" state, the stray light of the light beam 112a having large diffraction effect can be easily incident into the projection lens 130. Thus, the contrast of the image is also reduced.

Referring to FIG. 1 and FIG. 4A, if the mounting position of the lens 116 is accurate, misalignment of the light beam 112a being incident to the DMD 120 will not occur. On the other hand, referring to FIG. 3 and FIG. 4B, if the mounting position of the lens 116 is diverged from the desired position, misalignment of the light beam 112a being incident to the DMD 120 may occur.

As described above, since a diversion of the lens 116 from the desired mounting position causes misalignment of the light beam 112a being incident to the DMD 120, the horizontal position (Y-axis) or the vertical position (Z-axis) of the rod integrator 114 is generally adjusted to change the direction of the light beam 112a so as to be incident to the DMD 120. Alternatively, the oblique angle of the reflection sheet 118 is adjusted to change the direction of the light transmission path of the light beam 112a so as to be incident to the DMD 120.

However, the two adjusting method described above may only adjust the direction of the light transmission of the light beam 112a so as to be incident to the DMD 120, but can not adjust the angle of the light beam 112a so as to be incident to the projection lens 130. In addition, the errors due to the components described above may also be cumulated, thus the light beam 112a cannot be precisely incident to the stopper 132. Therefore, the conventional optical projector 100 can only project an image without shadow, but cannot project an image with high brightness.

SUMMARY OF THE INVENTION

One objective of the present invention is to provide an optical projection device, wherein the components thereof can be more precisely adjusted to display an image with high brightness and high contrast.

Another objective of the present invention is to provide a method of adjusting an optical projection device for displaying an image with high brightness and high contrast.

According to the above and other objectives, an optical projection device including an illumination system, a reflective light valve and a projection lens is provided. The illumination system includes a light source, an adjustable rod integrator and an adjustable reflection sheet. The adjustable reflection sheet is disposed behind the adjustable rod integrator along the light transmission path of the light beam. In addition, the reflective light valve is disposed behind the adjustable reflection sheet along the light transmission path of the light beam. The adjustable rod integrator can shift the light transmission path of the light beam so as to be incident to the reflective light valve. Moreover, the projection lens is disposed behind the reflective light valve along the light transmission path of the light beam. The adjustable reflection sheet can shift the light transmission path of the light beam so as to pass through the stopper of the projection lens.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
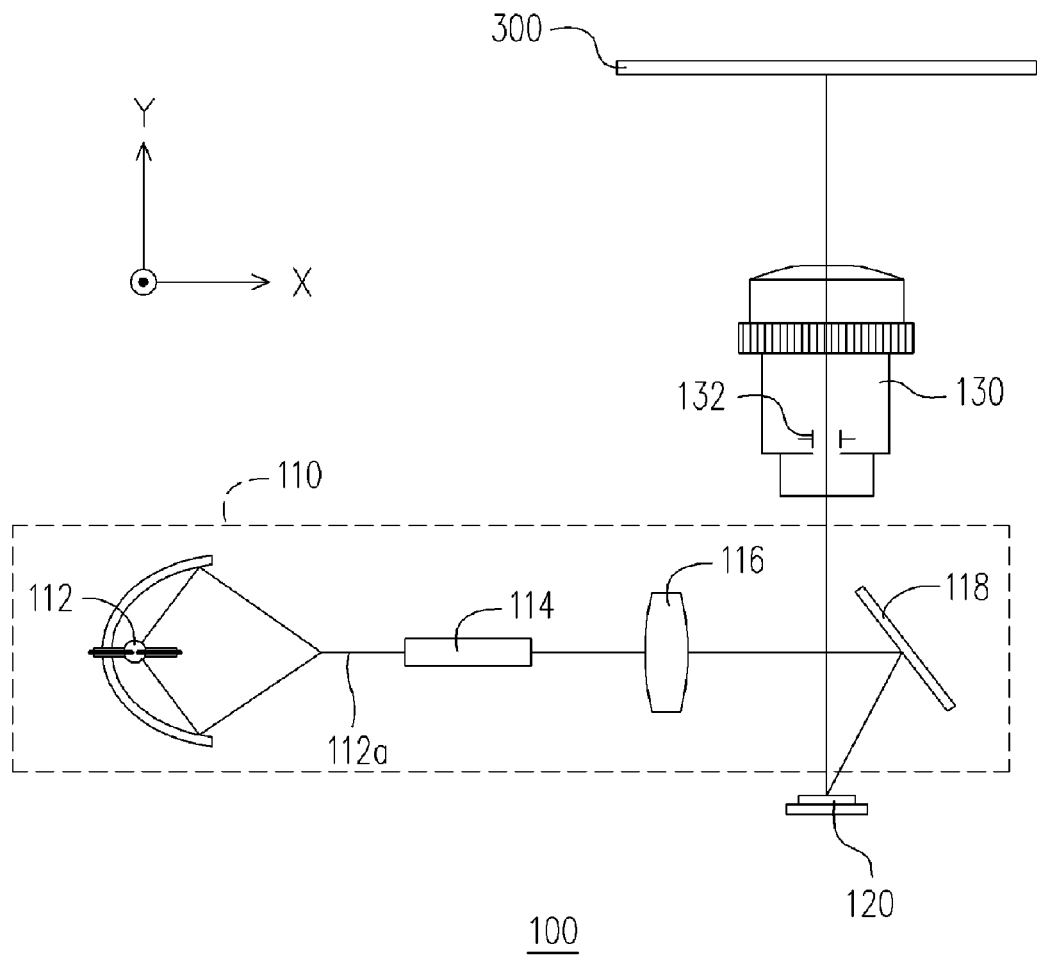
FIG. 1 is a schematic structural view of a conventional optical projection device.
Figure 2A:
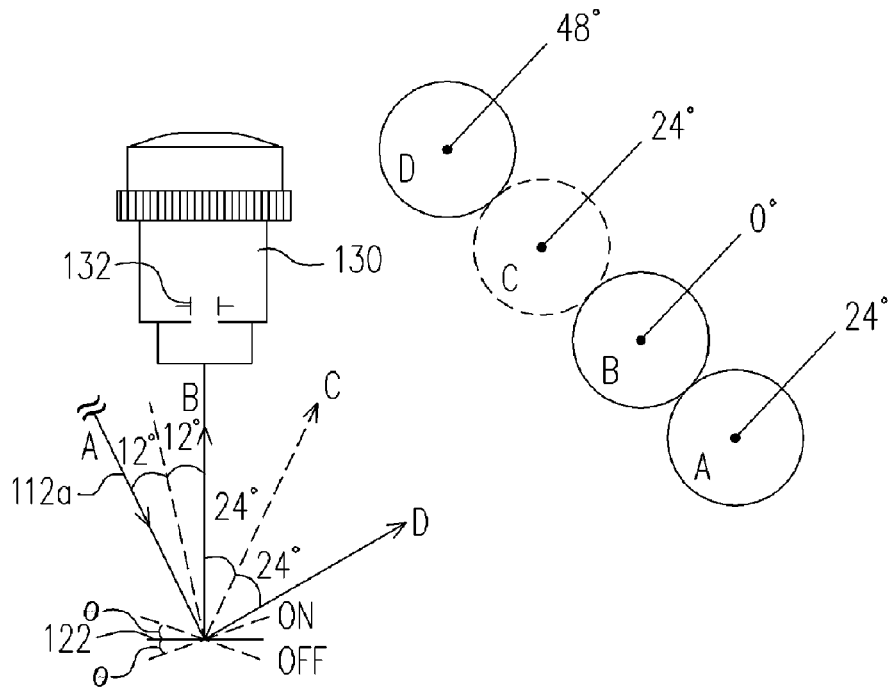
FIG. 2A and FIG. 2B illustrate the relationship between the oblique angle of the micro mirror of the DMD and the imaging position of the image in a conventional optical projection device.
Figure 2B:
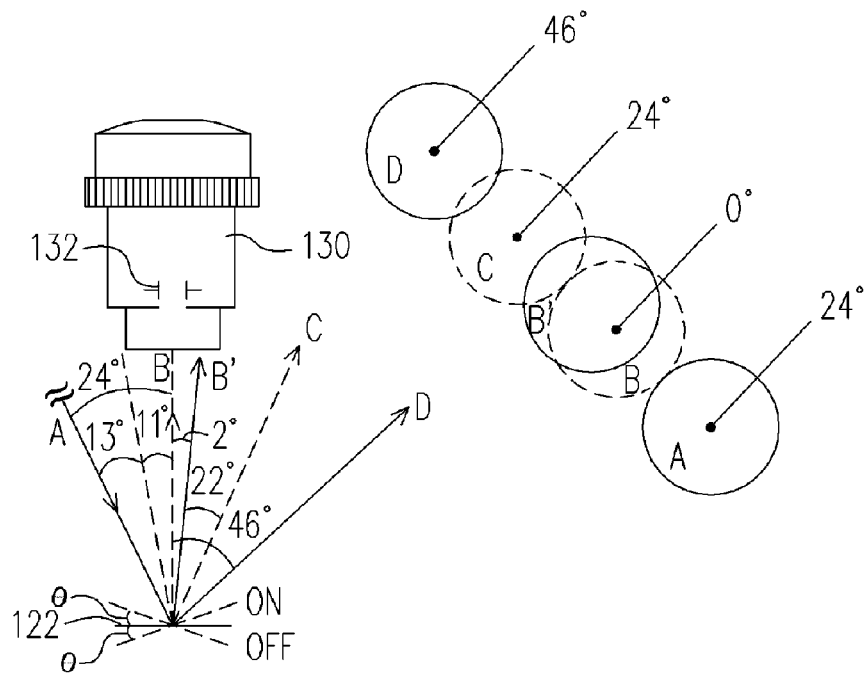
Figure 3:
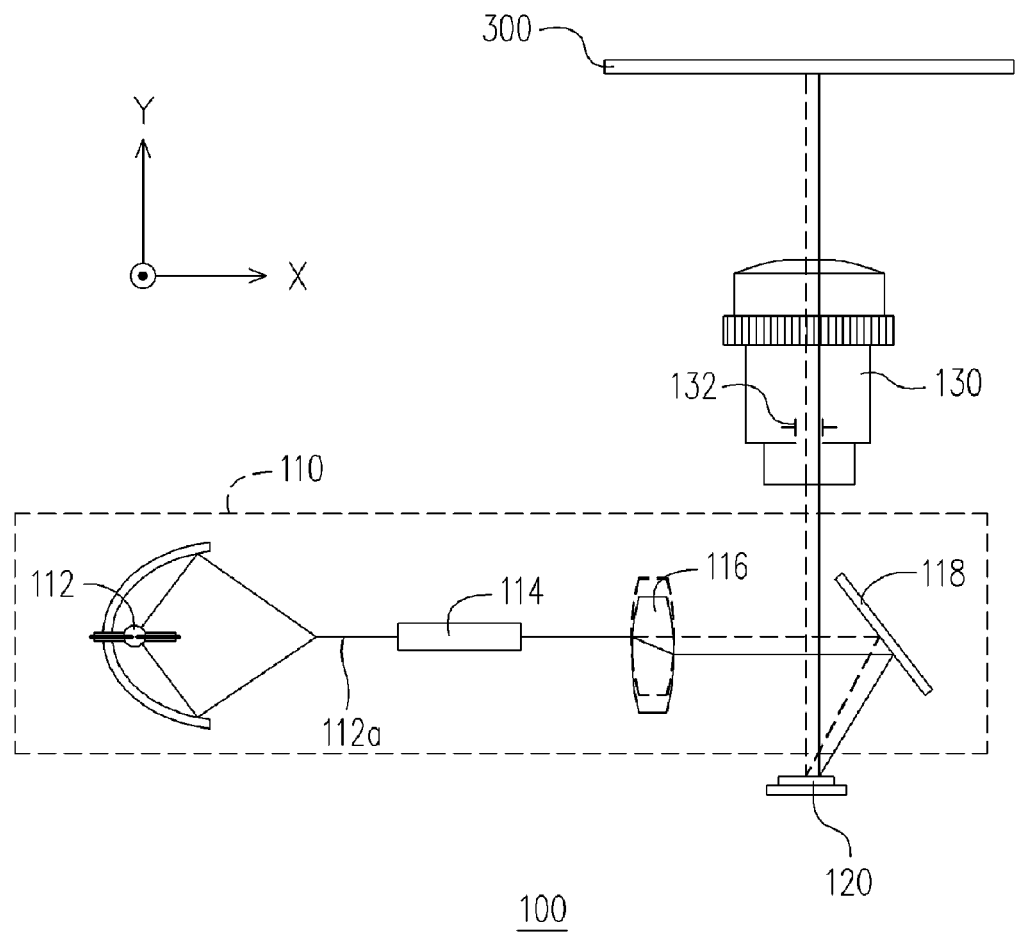
FIG. 3 is a schematic structural view of a conventional optical projection device with lens position error.
Figure 4A:
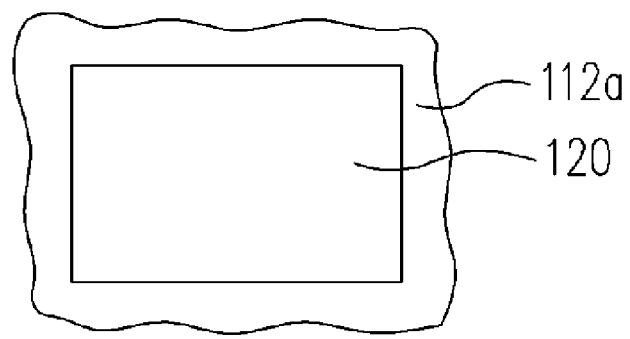
FIG. 4A and FIG. 4B illustrate position relationships between DMD and the light beam in a conventional optical projection device.
Figure 4B:
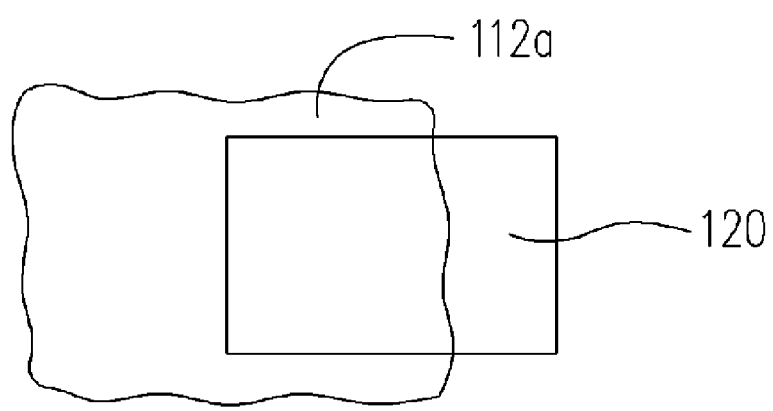
Figure 5:
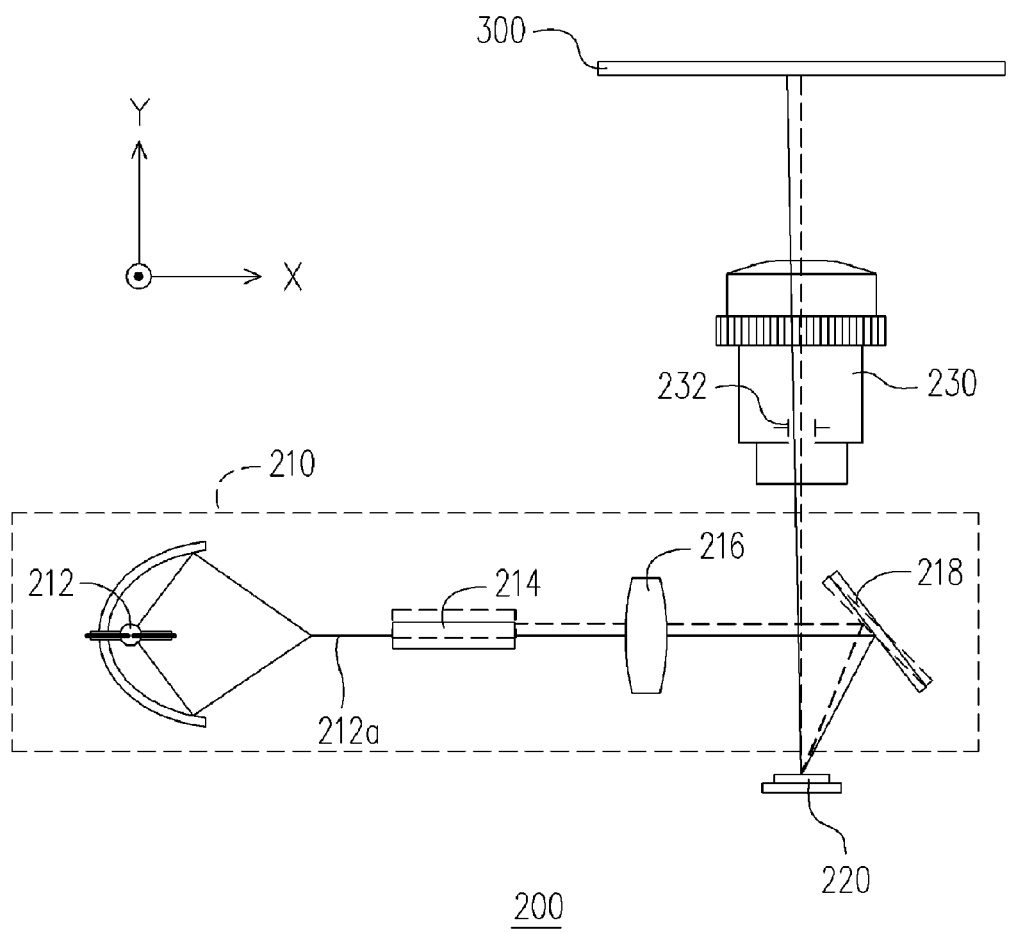
FIG. 5 is a schematic structural view of an optical projection device according to one embodiment of the present invention.
Figure 6:
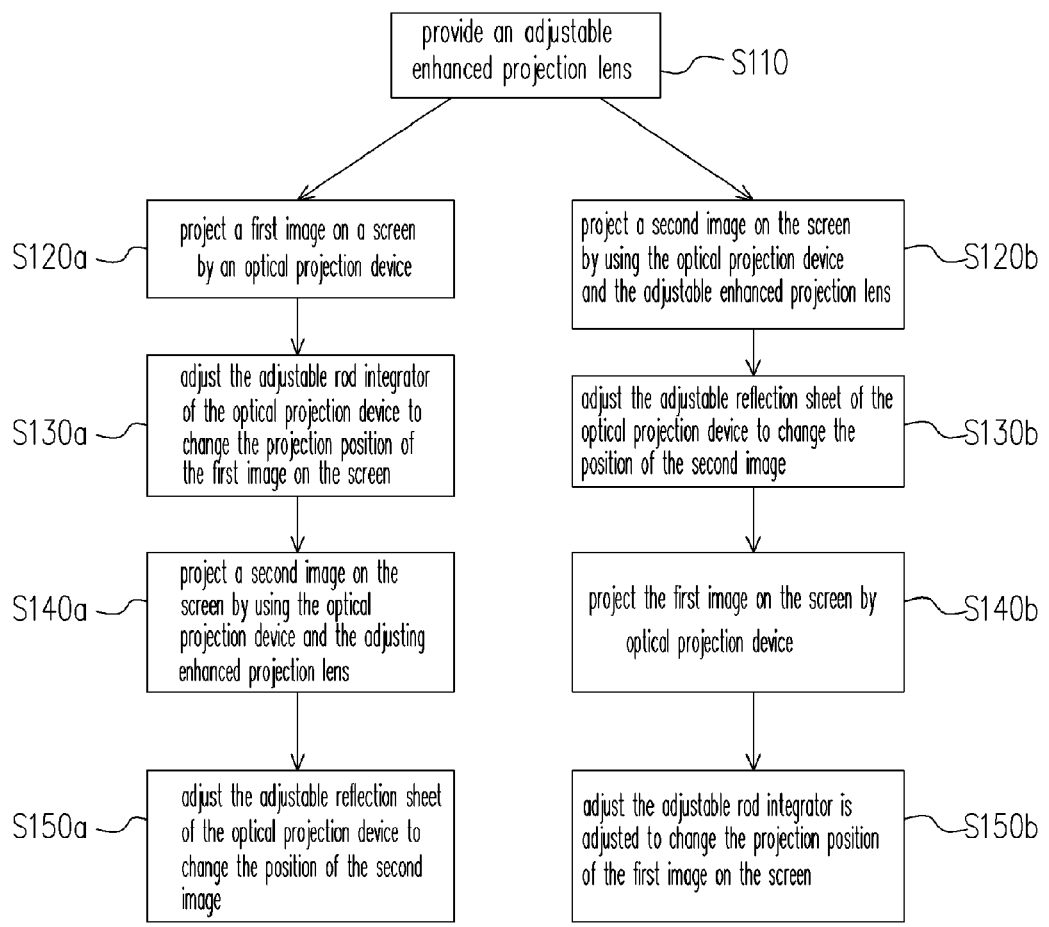
FIG. 6 illustrates a process flow chart of the method of adjusting an optical projection device according to one embodiment of the present invention.
Figure 7:
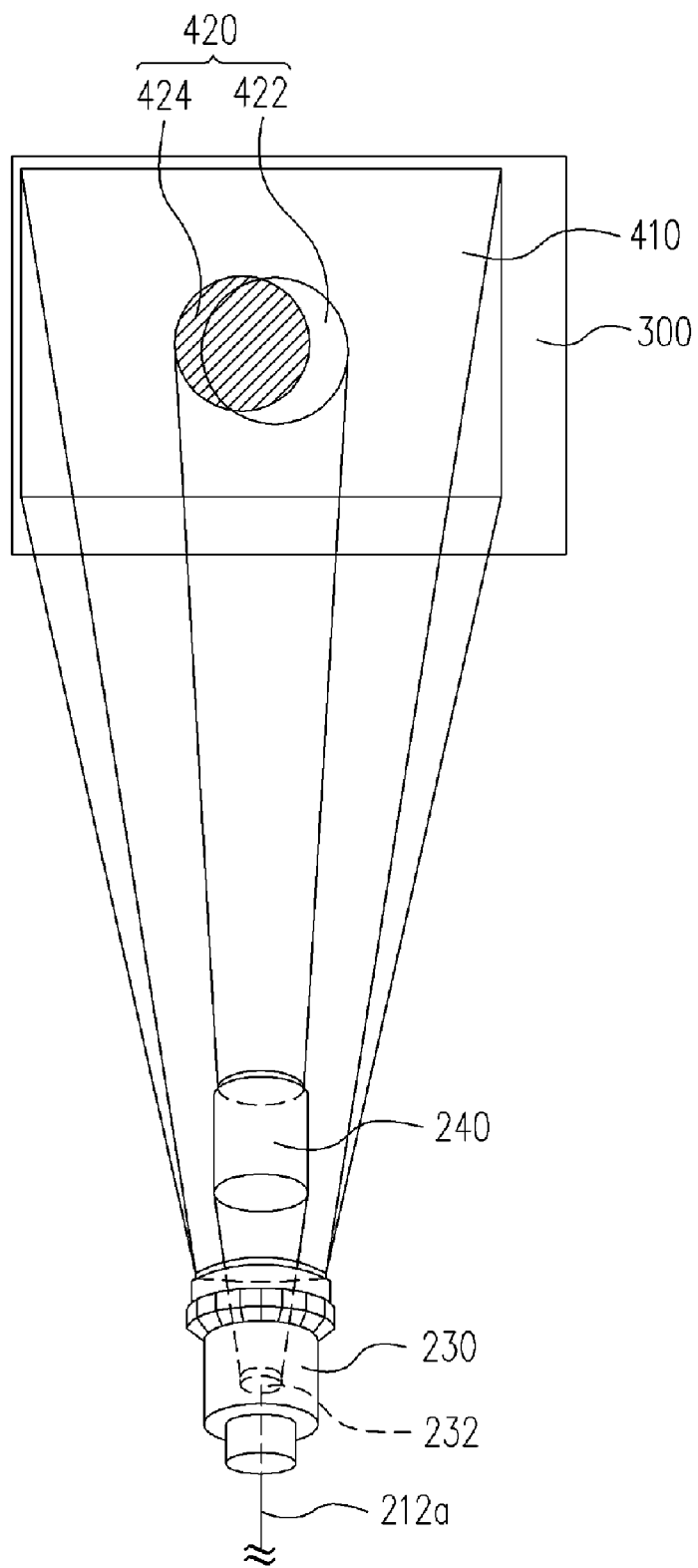
FIG. 7 illustrates a schematic view showing an image formed by an optical projection device.

Referring to FIG. 5, according to one embodiment of the present invention, an optical projection device 200 comprises an illumination system 210, a reflective light valve 220 and a projection lens 230. The illumination system 210 comprises a light source 212, an adjustable rod integrator 214, a lens 216 and an adjustable reflection sheet 218. The light source 212 provides a light beam 212a and comprises an ultra-high pressure mercury lamp, a metal-halide lamp or xenon (Xe) lamp. The adjustable rod integrator 214, the lens 216 and the adjustable reflection sheet 218 are all disposed along the light transmission path of the light beam 212a, and the lens 216 is disposed between the adjustable reflection sheet 218 and the adjustable rod integrator 214.

In addition, the reflective light valve 220 comprises a digital micro-mirror device (DMD) or a reflective liquid crystal on silicon (LCOS) panel. In one embodiment of the present invention, the DMD is disposed behind the adjustable reflection sheet 218 along the light transmission path of the light beam 212a. The adjustable rod integrator 214 shifts the light transmission path of the light beam 212a, thus the direction of the light beam 212a can be adjusted so as to be incident to the reflective light valve 220. Moreover, the projection lens 230 can be disposed behind the reflective light valve 220 along the light transmission path of the light beam 212a. The projection lens 230 comprises a stopper 232. The adjustable reflection sheet 218 shifts the light transmission path of the light beam 212a, thus the direction of the light beam 212a is adjusted so as to pass through the stopper 232 of the projection lens.

In the optical projection device 200, the adjustable rod integrator 214 comprises a hollow rod integrator or a solid rod integrator. In addition, the optical projection device 200 can be moved along a horizontal direction (Y-axis) or a vertical direction (Z-axis) for shifting the direction of the light beam 212a so as to be incident to the reflective light valve 220. The adjustable reflection sheet 218 comprises a plane reflection sheet or a curved reflection sheet. In addition, the oblique angle of the adjustable reflection sheet 218 can be adjusted to shift the direction of the light beam 212a so as to be incident to the stop 232.

In one embodiment of the present invention, the light beam 212a provided by the light source 212 can sequentially pass through the adjustable rod integrator 214 and the lens 216, and then arrive at the adjustable reflection sheet 218. The adjustable reflection sheet 218 can reflect the light beam 212a towards the reflective light valve 220. The reflective light valve 220 comprises a plurality of micro mirrors (not shown). It is noted that, when the micro mirrors are at "ON" state, the light beam 212a is reflected towards the projection lens 230. When the micro mirrors are at "OFF" state, the light beam 212a is diverged from the projection lens 230. Thereafter, the projection lens 230 can project the light beam 212a on the screen 300 to form an image thereon.

Accordingly, since the adjustable rod integrator 214 is capable of moving along the horizontal direction (Y-axis) or the vertical direction (Z-axis), it is possible to change the light transmission path of the light beam 212a so as to be incident at a desired position on the reflective light valve 220. In addition, since it is possible to adjust/change the oblique angle of the adjustable reflection sheet 218, it is possible to change the light transmission path of the light beam 212a so as to be precisely incident to the stop 232 of the projection lens 230 by adjusting the oblique angle of the adjustable reflection sheet 218. Therefore, in one embodiment of the present invention, the image projected by the optical projection device 200 does not include any shadow, and has high brightness and high contrast.

Referring to FIG. 6, FIG. 7, FIG. 8A and FIG. 8B, hereinafter, a method of adjusting the optical projection device, for example but not limited to, the optical projection device 200 shown in FIG. 5 will be described. The method for adjusting the optical projection device comprises the following steps.

First, at step S110, an adjustable auxiliary projection lens 240 is provided and disposed between the projection lens 230 and the screen 300. The adjustable auxiliary projection lens 240 comprises a lens having long back focal length, wherein the back focal point is set at the position of the stop 232 of the projection lens 230.

Thereafter, at step S120a, a first image 410 is projected on the screen 300 by the optical projection device 200.

Figure 8A:
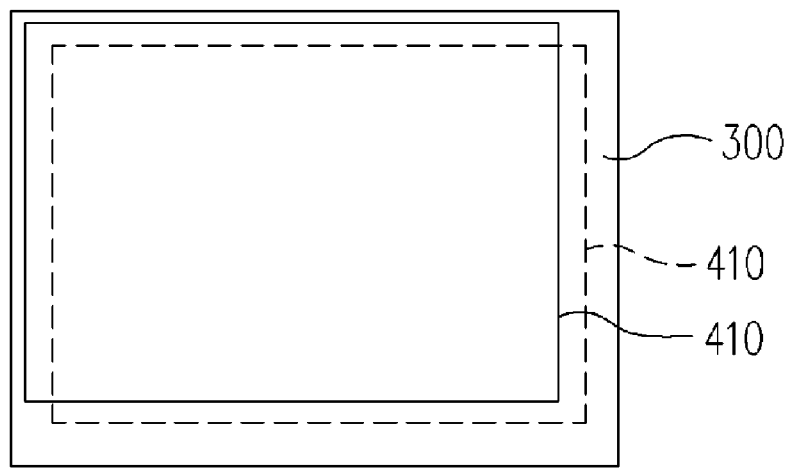
FIG. 8A illustrates a schematic view of an image displacement of a first image.

Then, at step S130a, the adjustable rod integrator 214 of the optical projection device 200 is adjusted to change the projection position of the first image 410 on the screen 300. Further, in the embodiment of the present invention, the position of the adjustable rod integrator 214 can be adjusted along the horizontal (Y-axis) or the vertical (Z-axis) direction so as to change the projection position of the first image 410 on the screen 300 for the first image 410 to be projected at the center of the screen 300 (as shown in FIG. 8A).

Next, at step S140a, a second image 420 is projected on the screen 300 by using the optical projection device 200 and the adjustable auxiliary projection lens 240.

Figure 8B:
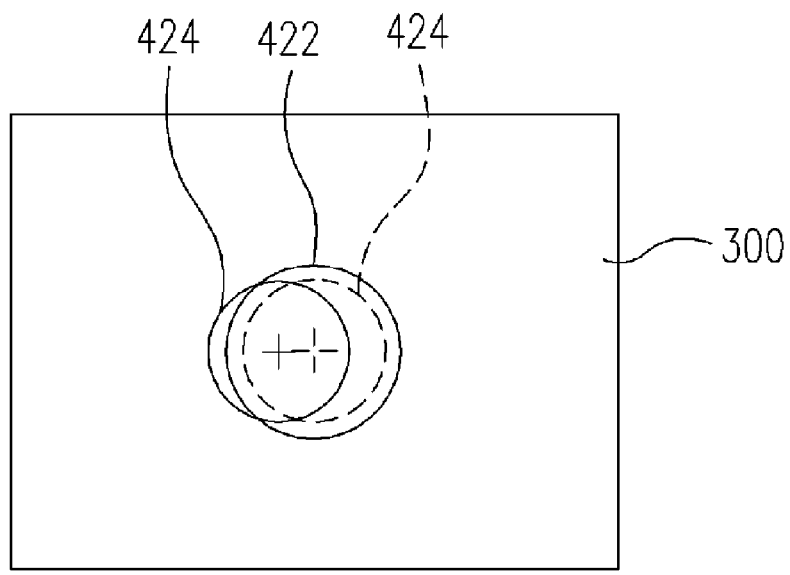
FIG. 8B illustrates a schematic view of an image displacement of a second image.

Thereafter, at step S150a, the adjustable reflection sheet 218 of the optical projection device 200 is adjusted to change the position of the second image 420. In one embodiment of the present invention, the second image 420 comprises a stopper image 422 and a light beam image 424. The position of the second image 420 can be changed by changing the projection position of the light beam image 424 on the screen 300. In addition, in one embodiment of the present invention, the position of the light beam image 424 can be changed by adjusting an oblique angle of the adjustable reflection sheet 218. Therefore, position of the light beam image 424 can be changed to be projected at the center of the stop image 422 (as shown in FIG. 8B).

In the method for adjusting the optical projection device described above, when the position of the light beam image 424 is adjusted, the previously adjusted position of the first image 410 can be slightly shifted. Therefore, the step S130a and the step S150a can be repeated until the first image 410 is projected on the center of the screen 300 and the light beam image 424 is projected on the center of the stopper image 422.

In one embodiment of the present invention, after the step S110, the step S120b can also be performed to project a second image 420 on the screen 300 by using the optical projection device 200 and the adjustable auxiliary projection lens 240.

Thereafter, at step S130b, the adjustable reflection sheet 218 of the optical projection device 200 is adjusted to change the position of the second image 420.

Then, at step S140b, the first image 410 is projected on the screen 300 by optical projection device 200.

Next, at step S150b, the adjustable rod integrator 214 of the optical projection device 200 is adjusted to change the projection position of the first image 410 on the screen 300.

Thereafter, the method of adjusting the position of the first image 410 and the second image 420 are similar or same as the method described above and therefore the detail description thereof will not be repeated again.

Thereafter, in the method for adjusting the optical projection device described above, when the position of the first image 410 is adjusted, the previously adjusted position of the light beam image 424 can be slightly shifted. Therefore, the step S130b and the step S150b can be repeated until the first image 410 is projected at the center of the screen 300 and the light beam image 424 is projected at the center of the stopper image 422.

It is noted that, since the position of the previously adjusted image can be slightly shifted, it is possible to adjust the position of the first image 410 at a desired position on the screen 300, and then the position of the light beam image 424 can be adjusted. It is also possible to adjust the position of the light beam image 424 to a desired position on the screen 300, and then the position of the first image 410 can be adjusted. Thus, the number of the adjustment steps can be reduced. In addition, before adjusting the position of the first image 410, the adjustable auxiliary projection lens 240 can be removed.

Figure 9:
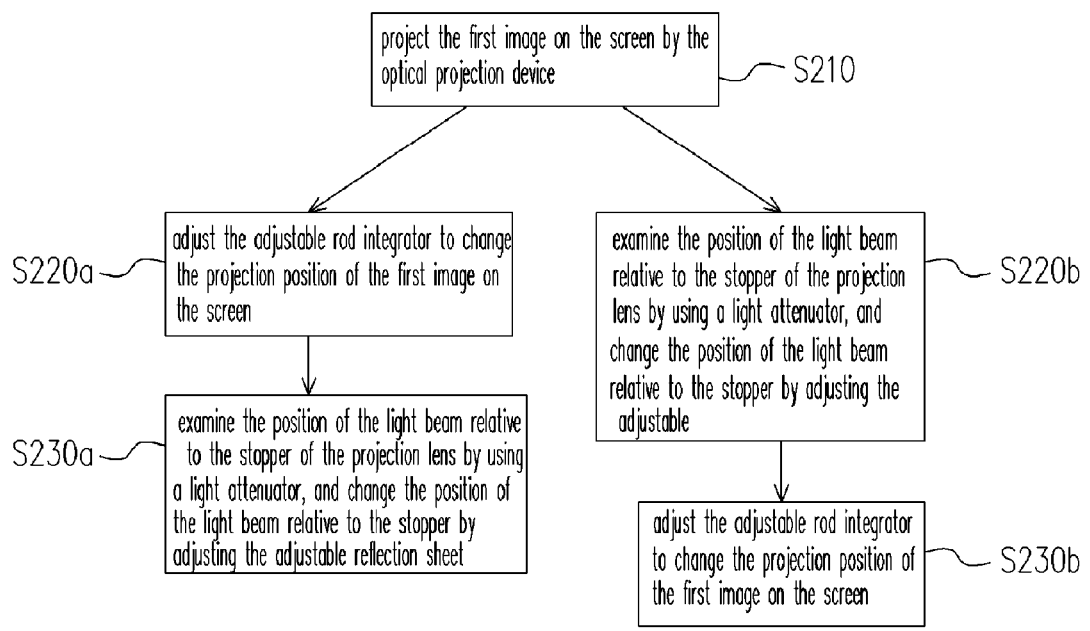
FIG. 9 illustrates a process flow chart of the method for adjusting an optical projection device according to another embodiment of the present invention.

Referring to FIG. 8A and FIG. 9, in the method of adjusting an optical projection device of another preferred embodiment of the present invention, the optical projection device 200 shown in FIG. 5 will be described. The method of adjusting an optical projection device comprises the following steps.

First, at step S210, the first image 410 is projected on the screen 300 by the optical projection device 200.

Thereafter, at step S220a, the adjustable rod integrator 214 of the optical projection device 200 is adjusted to change the projection position of the first image 410 on the screen 300.

Then, at step S230a, the position of the light beam 212a relative to the stopper 232 of the projection lens 230 is examined by using a light attenuator (not shown). In addition, the position of the light beam 212a relative to the stopper 232 is changed by adjusting the adjustable reflection sheet 218 of the optical projection device 200. Thus, the light transmission path of the light beam 212a can be adjusted/changed so as to be precisely incident to the stopper 232.

In the method of adjusting the optical projection device described above, when the position of the light beam 212a relative to the stopper 232 is adjusted, the previously adjusted position of the first image 410 can be slightly shifted. Therefore, the step S220a and the step S220b can be repeated until the first image 410 is projected at the center of the screen 300 and the light beam 212a is incident to the center of the stop 232.

In one embodiment of the present invention, after the step S210, the step S220b can also be performed. Therefore, the position of the light beam 212a relative to the stopper 232 of the projection lens 230 can be examined by using a light attenuator (not shown). In addition, the position of the light beam 212a relative to the stopper 232 can be changed by adjusting the adjustable reflection sheet 218 of the optical projection device 200. Therefore, it is possible to change the light transmission path of the light beam 212a so as to be precisely incident to the stopper 232.

Thereafter, at step S230b, the adjustable rod integrator 214 of the optical projection device 200 can be adjusted to change the projection position of the first image 410 on the screen 300.

In the method for adjusting the optical projection device described above, when the position of the first image 410 is adjusted, the previously adjusted position of the light beam 212a relative to the stopper 232 can be slightly shifted. Therefore, the step S220b and the step S230b can be repeated until the position of the first image 410 is adjusted to be at the center of the screen 300 and the light beam 212a is incident to the stopper 232.

Moreover, the method of adjusting the adjustable rod integrator 214 and the adjustable reflection sheet 218, and the method of adjusting the first image 410 are similar or same as the method described above and therefore detail description thereof will not be repeated.

Accordingly, the optical projection device and the method for adjusting the optical projection device of the present invention include at least the following advantages. First, it is possible to change the light transmission path of the light beam so as to be incident at a desirable position on the reflective light valve, thus the projected image does not include shadow. Next, the light beam can be precisely incident to the stopper of the projection lens, thus the projected image has high brightness and high contrast.

The foregoing description of the embodiment of the present invention has been presented for purposes of illustration and description. It is not intended to be exhaustive or to limit the invention to the precise form or to exemplary embodiments disclosed. Accordingly, the foregoing description should be regarded as illustrative rather than restrictive. It is intended that the scope of the invention be defined by the claims appended hereto and their equivalents in which all terms are meant in their broadest reasonable sense unless otherwise indicated.

What is claimed is:

1. An optical projection device, comprising:
   an illumination system, comprising:
   a light source for providing a light beam;
   an adjustable rod integrator disposed in a light transmission path of the light beam;
   an adjustable reflection sheet disposed behind the adjustable rod integrator in the light transmission path of the light beam;
   a reflective light valve disposed behind the adjustable reflection sheet in the light transmission path of the light beam, wherein the adjustable rod integrator shifts the light transmission path of the light beam to be incident to the reflective light valve; and
   a projection lens disposed behind the reflective light valve in the light transmission path of the light beam, wherein the projection lens comprises a stopper, and the adjustable reflection sheet shifts the light transmission path of the light beam to pass through the stopper of the projection lens.

2. The optical projection device of claim 1, wherein the adjustable rod integrator moves along a horizontal direction or a vertical direction for shifting a position of the light beam to be incident to the reflective light valve.

3. The optical projection device of claim 1, wherein an oblique angle of the adjustable reflection sheet is adjusted for shifting a position of the light beam to be incident to the stopper.

4. The optical projection device of claim 1, wherein the light source is selected from the group consisting of an ultra-high pressure mercury lamp, a metal-halide lamp and a xenon (Xe) lamp.

5. The optical projection device of claim 1, wherein the adjustable rod integrator is selected from the group consisting of a hollow rod integrator and a solid rod integrator.

6. The optical projection device of claim 1, wherein the adjustable reflection sheet is selected from the group consisting of a plane reflection sheet and a curved reflection sheet.

7. The optical projection device of claim 1, wherein the reflective light valve is selected from the group consisting of a digital micro-mirror device (DMD) and a reflective liquid crystal on silicon (LCOS) panel.

8. An adjusting method of an optical projection device, comprising:
   providing an adjustable auxiliary projection lens;
   projecting a first image on a screen by the optical projection device, and projecting a second image on the screen by the optical projection device and the adjustable auxiliary projection lens; and
   adjusting an adjustable rod integrator and an adjustable reflection sheet of the optical projection device to change a projection position of the first image on the screen and the second image.

9. The adjusting method of claim 8, wherein the second image comprises a stopper image and a light beam image, and the step of changing the second image is implemented by changing a projection position of the light beam image on the screen.

10. The adjusting method of claim 8, wherein the step of adjusting the adjustable rod integrator and the adjustable reflection sheet of the optical projection device comprises:
    adjusting the adjustable rod integrator of the optical projection device to change the projection position of the first image on the screen; and
    adjusting the adjustable reflection sheet of the optical projection device to change projection position of the second image.

11. The adjusting method of claim 8, wherein the step of adjusting the adjustable rod integrator and the adjustable reflection sheet of the optical projection device comprises:
    adjusting the adjustable reflection sheet of the optical projection device to change the projection position of the second image; and
    adjusting the adjustable rod integrator of the optical projection device to change the projection position of the first image on the screen.

12. The adjusting method of claim 8, further comprising repeating the step of adjusting the adjustable rod integrator and the adjustable reflection sheet of the optical projection device at least once.

13. The adjusting method of claim 8, wherein the step of adjusting the adjustable rod integrator comprises:
    adjusting a position of the adjustable rod integrator along horizontal or vertical direction.

14. The adjusting method of claim 8, wherein the step of adjusting the adjustable reflection sheet comprises:
    adjusting an oblique angle of the adjustable reflection sheet.

15. An adjusting method of an optical projection device, comprising:
    projecting an image on a screen by the optical projection device; and
    adjusting an adjustable rod integrator of the optical projection device to change a projection position of the image on the screen, and examining a position of the light beam relative to a stopper of the projection lens by a light attenuator, and changing the direction of the light beam relative to the stopper by adjusting the adjustable reflection sheet of the optical projection device.

16. The adjusting method of claim 15, wherein the step of adjusting an adjustable rod integrator of the optical projection device comprises:

adjusting the adjustable rod integrator of the optical projection device to change a projection position of the image on the screen; and adjusting the adjustable reflection sheet of the optical projection device to change the direction of the light beam relative to the stopper.

17. The adjusting method of claim 15, wherein the step of adjusting an adjustable rod integrator of the optical projection device comprises:

adjusting the adjustable reflection sheet of the optical projection device to change the relative position of the light beam and the stop; and adjusting the adjustable rod integrator of the optical projection device to change a projection position of the image on the screen.

18. The adjusting method of claim 15, further comprising repeating the step of adjusting an adjustable rod integrator of the optical projection device at least once.

19. The adjusting method of claim 15, wherein a step of adjusting the adjustable rod integrator comprises:

adjusting a position of the adjustable rod integrator along a horizontal or vertical direction.

20. The adjusting method of claim 15, wherein the step of adjusting the adjustable reflection sheet comprises:

adjusting an oblique angle of the adjustable reflection sheet.

* * * * *